(12) United States Patent  
Herley (10) Patent No.: US 7,657,123 B2  
(45) Date of Patent: Feb. 2, 2010

(54) TEXT DOCUMENT CAPTURE WITH JITTERED DIGITAL CAMERA

(75) Inventor: Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1787 days.

(21) Appl. No.: 09/970,144

(22) Filed: Oct. 3, 2001

(65) Prior Publication Data

US 2003/0063814 A1   Apr. 3, 2003

(51) Int. Cl.
*G06K 9/32* (2006.01)
*G06K 9/40* (2006.01)
*H04N 1/46* (2006.01)

(52) U.S. Cl. .................. 382/300; 382/254; 358/525

(58) Field of Classification Search .......... 348/219.1; 382/270, 217, 273
See application file for complete search history.

(56) References Cited

U.S. PATENT DOCUMENTS 4,593,325 A * 6/1986 Kannapell et al. ........ 358/3.22
5,083,313 A * 1/1992 Reinsch .................. 382/270
5,392,365 A * 2/1995 Steinkirchner ........... 382/260
5,666,160 A * 9/1997 Hwang .................. 348/240.2
5,801,814 A * 9/1998 Matsumoto ............... 355/40
6,285,804 B1 * 9/2001 Crinon et al. ............ 382/299
6,670,986 B1 * 12/2003 Shoshan et al. ......... 348/219.1

* cited by examiner

*Primary Examiner*—Charles Kim  
(74) *Attorney, Agent, or Firm*—Lyon & Harr, LLP; Mark A. Watson (57) ABSTRACT

A digital imaging device such as a digital camera is used to obtain multiple digital images of all of a text document segment. The text document segment could be the entire text document so that each digital image would be of the entire text document. The multiple images are obtained while lateral jittering is imparted between the digital imaging device and the text document. The lateral jittering may be in a pair of transverse (e.g., perpendicular) directions. An enhanced resolution representation of the text document is formed from the multiple laterally displaced images and de-blurred as a multi-frame reconstruction.

28 Claims, 7 Drawing Sheets

TEXT DOCUMENT CAPTURE WITH JITTERED DIGITAL CAMERA

TECHNICAL FIELD

The present invention relates to text document image capture with digital imaging devices and, in particular, to employing lateral jittering between a digital imaging device and a text document to obtain increased image resolution for the text document.

BACKGROUND AND SUMMARY

Scanners represent a low cost and convenient way to capture images and documents. Devices that give 300 dots-per-inch (dpi) or higher optical resolution are readily available and are more than adequate to acquire documents containing text in the size of 8 points or even 7 points. By contrast, some digital camera imaging devices have a VGA resolution of 640×480 pixels. If applied to imaging text on a U.S. letter-sized page (i.e., 8.5 by 11 inches or approx 21.5 by 28 cm), such a VGA camera is capable of achieving only about 60 dpi. Such resolution is inadequate to distinguish text characters used in most text documents.

A drawback of scanners is that they are often slow; scanning a page can take a significant fraction of a minute because of the linear motion between the page and the scan bar. This makes acquisition of multi-page documents particularly inconvenient and time-consuming. By contrast, a VGA video camera is generally capable of acquisition at 60 frames/second so that acquisition of multiple image frames is comfortably achievable in less than a second.

The present invention uses a digital imaging device such as a digital camera to obtain multiple digital images of all of a text document segment. In one implementation, the text document segment could be the entire text document so that each digital image would be of the entire text document. The multiple images are obtained while lateral jittering is imparted between the digital imaging device and the text document. The lateral jittering may be in a pair of transverse (e.g., perpendicular) directions. An enhanced resolution representation of the text document is formed from the multiple laterally displaced images and de-blurred as a multi-frame reconstruction.

The multi-frame reconstruction can be significantly simplified because text documents primarily include regions that are spatially piecewise constant (e.g., monochrome text on a monochrome background). In contrast, conventional multi-frame image reconstruction addresses the issue of reconstruction of arbitrary image objects, which requires solution of ill-constrained Fourier reconstruction problems.

Directing consideration to images that are spatially piecewise constant means that only transitions between a limited palette of discrete values need be ascertained. This simplification holds well for plain text on plain backgrounds and greatly eases the task of reconstruction from multiple frames. In one exemplary implementation employing a digital imaging device (camera) with VGA resolution, this multi-frame reconstruction algorithm can achieve a 4× improvement in resolution in each dimension to provide an equivalent of a 240 dpi resolution scan in a second or so.

Additional objects and advantages of the present invention will be apparent from the detailed description of the preferred embodiment thereof, which proceeds with reference to the accompanying drawings.

DETAILED DESCRIPTION OF PREFERRED EMBODIMENT

Figure 1:
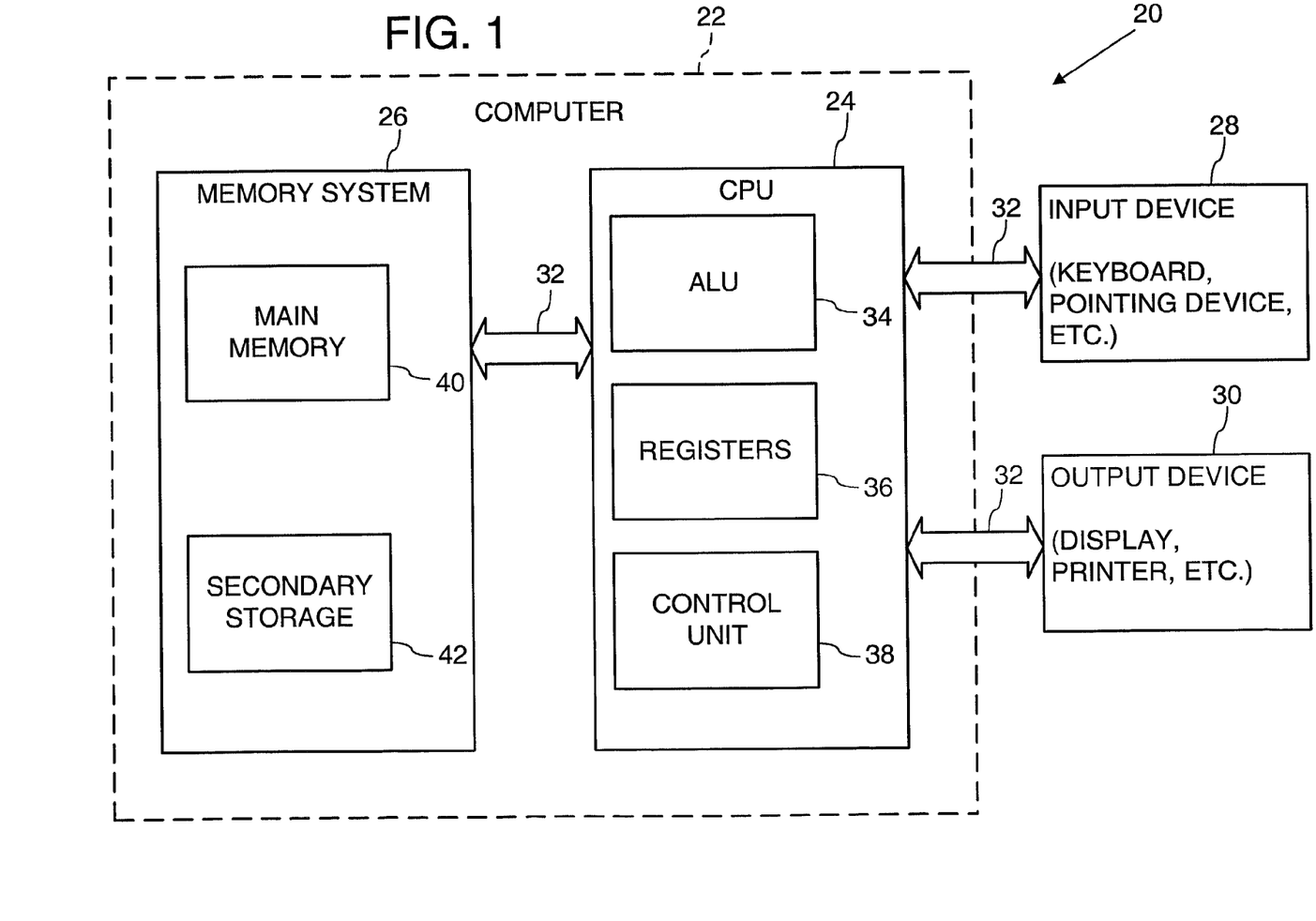
FIG. 1 illustrates an operating environment for an embodiment of the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software that controls the computer system operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals.

The memory locations where data bits are maintained are physical locations that have particular electrical, magnetic, or optical properties corresponding to the data bits.

Figure 2:
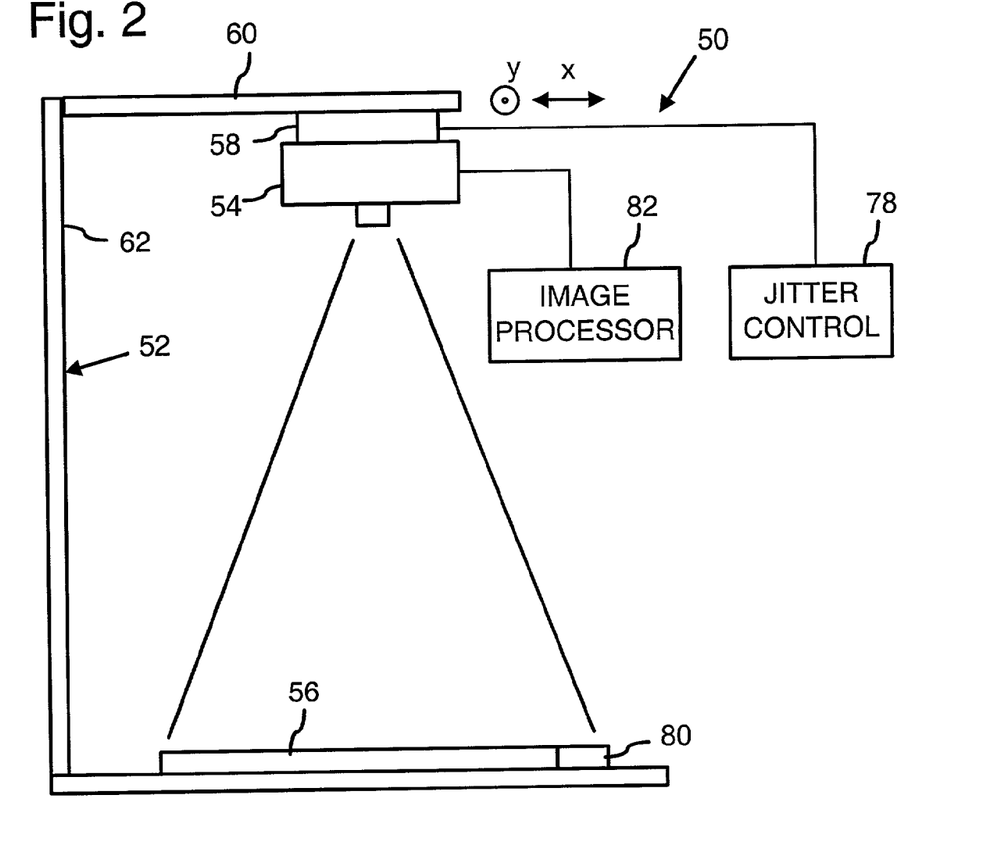
FIG. 2 is a schematic side view of a digital camera document capture system.

FIG. 2 is a schematic side view of a digital camera document capture system 50 having a stand 52 that supports a digital camera 54 facing a text document 56 (shown with exaggerated thickness for clarity).

For example, digital camera 54 may be of a VGA standard resolution, but could alternatively have higher or lower resolutions. In one implementation, document 56 is generally bi-chromatic and has text characters or "foreground" of one color or luminance (e.g., black) and a background of another color or luminance (e.g., white).

Digital camera 54 is secured to a camera jitter mechanism 58 mounted on an arm 60 extending from a riser 62. Arm 60 and riser 62 function to hold camera 54 in spaced-apart relation to document 56 so that all of it, or at least a substantial portion of it, can be imaged at a time. Camera jitter mechanism 58 moves digital camera 54 in a pair of transverse (e.g., generally perpendicular) lateral directions relative to document 56. In the illustration of FIG. 2, the lateral transverse directions are indicated by X- and Y directions, the latter extending into and out of the plane of the Figure.

Digital camera 54 may be a general-purpose hand-held or desktop camera of a VGA standard resolution, but could alternatively be dedicated to document capture system 50 or could have higher or lower resolutions. Digital camera 54 includes one or more lenses (not shown) for imaging light from a scene onto a pixelated light detector (not shown), as is known in the art. The pixelated light detector is commonly formed of an array of charge-coupled device (CCD) or CMOS sensors, for example, onto which light from an object or scene is imaged by the one or more lenses to form a digital picture. Each pixel in the light detector encompasses an image area and generates a corresponding image pixel signal corresponding to the light received from a part of the object or scene.

Figure 3:
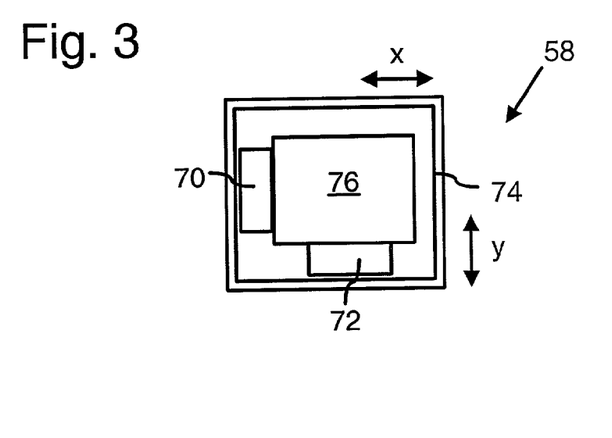
FIG. 3 is a schematic plan view of camera jitter mechanism.

FIG. 3 is a schematic plan view of camera jitter mechanism 58 showing a pair of transverse (e.g., generally perpendicular) jitter drivers 70 and 72 coupled between a camera support structure 74 and a jitter mechanism base 76. Camera 54 is held in a fixed manner to camera a support structure 74. Jitter drivers 70 and 72 provide cyclic jitter motion to camera support structure 74 (and camera 54) in the respective X- and Y-directions.

Jitter drivers 70 and 72 may be or include piezo-electric oscillators, as are known, and may be controlled by a jitter control system 78 (FIG. 2) that controls the magnitude of oscillations or jitter. In one implementation, jitter control system 78 directs oscillators 70 and 72 to provide oscillations with magnitudes of about In one implementation, the period of the oscillations can be on the order of a second or so, and the amplitudes may be arranged to be on the order of the dimension of a camera sensor pixel. The precise trajectory induced by the oscillators need not be controlled, but rather can be measured. For example, a fixed pattern target 80 with a pattern of perpendicular lines, for example, can be positioned in the image field of digital camera 54. Jitter control mechanism 78 could be implemented in software executed by computer system 20 (FIG. 1), for example, and is used to maintain the oscillation amplitude on the order of a camera sensor pixel size.

Generally, the jitter amplitude could be measured with reference to fixed pattern target 80 so that at any time at which a frame is acquired the position and velocity of camera 54 are known. This would allow measurement of a point spread function that is time-varying the motion of camera 54 causes an image blur. The point spread function represents the size a blurred image relative to an original point target or object.

With the oscillation amplitude maintained on the order of a pixel size, the point spread function as a function of time is minor and may be represented by a constant b.

In operation, camera 54 obtains multiple digital images of document 56. The images are laterally displaced according to the jitter provided by jitter mechanism 58 and so are formed with different alignments between camera 54 and document 56. The images are delivered to an image processing system 82 that establishes an enhanced resolution image from the multiple laterally displaced ones. For example, image processing system 82 may be implemented in software executed by computer system 20 (FIG. 1).

Figure 4:
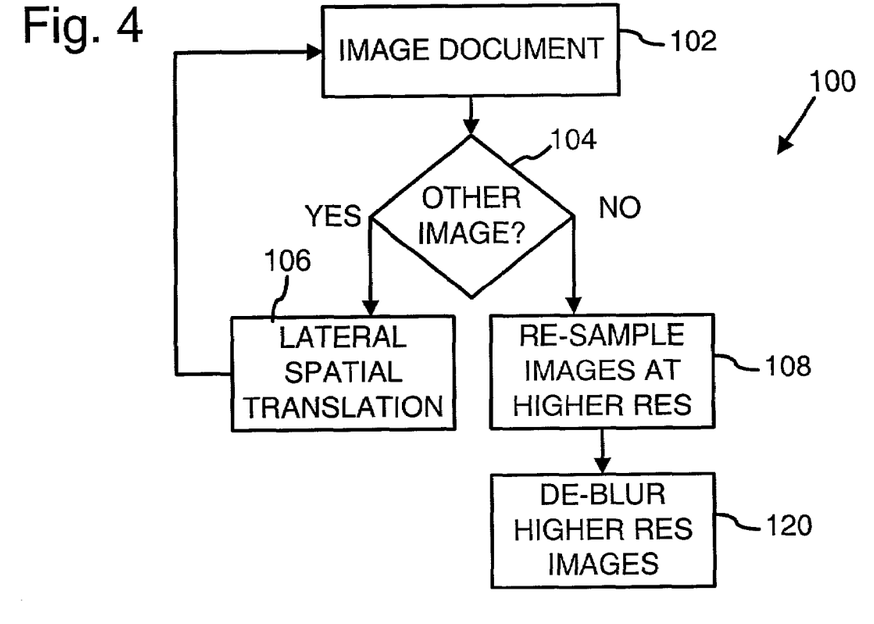
FIG. 4 is a flow diagram of a digital camera document capture method for providing image capture of a text document.

FIG. 4 is a flow diagram of a digital camera document capture method 100 for providing large area image capture of a text document.

Document capture method 100 may utilize document capture system 50, or the like, together with computer-implemented execution of method 100.

Process block 102 indicates that a digital camera obtains a digital camera image of a text document, either all or a large area segment of it.

The following description is directed to an implementation in which the digital camera image is obtained for all of a text document. It will be appreciated, however, that the digital camera image could be formed of all of a large area segment of a text document.

Inquiry block 104 represents an inquiry as to whether another digital camera image is to be obtained. Multiple digital camera images are required and inquiry block 104 represents a determination of whether enough images have been obtained. Inquiry block 104 proceeds to process block 106 if another digital camera image is to be obtained and otherwise proceeds to process block 108.

Process block 106 indicates that a lateral spatial translation is imparted between the digital camera and the text document. The text document is generally planar, as would be characteristic of a sheet of paper with printed text. The spatial translation is lateral in the sense that the translation is generally parallel to the general plane of the text document, as indicated by the X- and Y directions in FIGS. 2 and 3. In document capture system 50 the lateral spatial translation is provided by operation of jitter mechanism 58. Process block 106 returns to process block 102.

As described above, document capture system 50 provides lateral translation of digital camera 54 with respect to text document 56. It will be appreciated, however, that the lateral translation could alternatively be applied to the text document relative to the digital camera or to both.

Moreover, the lateral translation of document capture system 50 occurs simultaneously in both of the transverse (e.g., perpendicular) directions.

In another implementation, lateral translation could occur in each of the transverse directions separately.

The steps represented by process blocks 102, 104, and 106 function to form N-number of multiple digital camera images of all of text document 56, or N-number of multiple digital camera images of all of a large area segment of text document 56. The multiple samples provide a super-sampling of the text document and thereby allow an increase in the effective resolution of the digital camera, as described below. In one exemplary implementation, the digital camera can have a VGA image resolution of 640×480 pixels, thereby resulting in a total of N×640×480 image pixel samples. The N-number of digital camera images obtained by process blocks 102, 104, and 106 can be 16. This camera resolution and number of samples are merely exemplary, and either or both could be changed.

Figure 5:
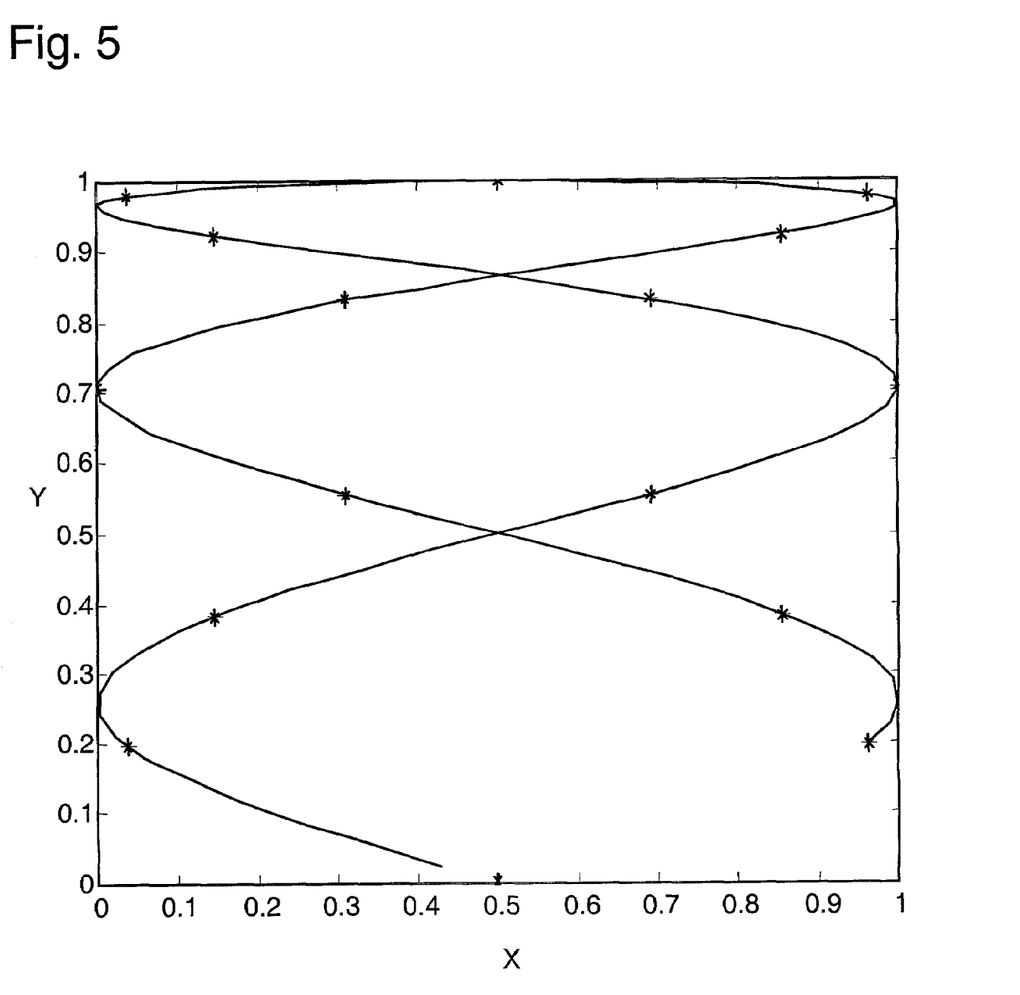
FIG. 5 is a graph illustrating the relative positions or trajectory of a single pixel of the digital camera provided by simultaneous bi-directional lateral translation.

FIG. 5 is a graph illustrating 16 relative positions (i.e., the trajectory) of a single pixel sensor of the digital camera provided by simultaneous bi-directional lateral translation. The relative positions of the single pixel center or locus are indicated by asterisks relative to normalized X- and Y-axis scales in which the unit distance represents one VGA pixel width along the corresponding axis.

The relative positions represent the instants at which images or samples are acquired by the digital camera during the lateral translation (e.g., bi-directional oscillation). In this illustration, a cyclic lateral translation of the single pixel is indicated by lines connecting the successive positions. Such cyclic lateral translation can correspond, for example, to operation of camera jitter mechanism 58 with transverse oscillators 70 and 72.

Process block 108 indicates that the multiple digital camera images are re-sampled at an increased resolution. Re-sampling entails forming an enhanced resolution image from the multiple (e.g., 16) image samples by mapping the non-uniform samples to a uniform or regular grid. This is sometimes called multi-frame reconstruction. For example, multiple enhanced resolution image pixels are determined from the multiple (e.g., 16) image pixel samples for each digital camera pixel.

Figure 6:
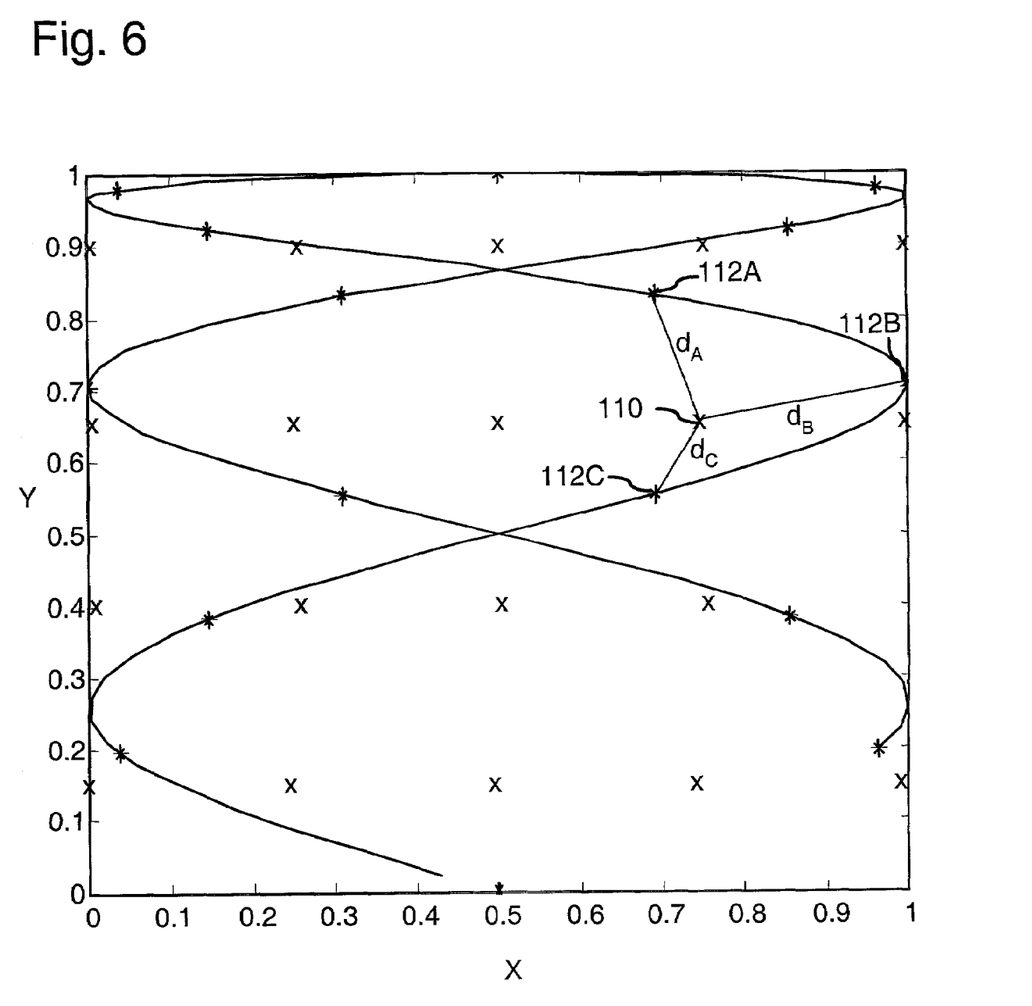
FIG. 6 is a reproduction of the graph of FIG. 5 showing an enhanced resolution image pixel array.

FIG. 6 is a reproduction of the graph of FIG. 5 showing an enhanced resolution image pixel grid or array in which individual enhanced resolution pixels are indicated by the symbol "x". A pixel value is determined or calculated for each enhanced resolution pixel (indicated by "x") from one or more of the multiple image pixel samples (indicated by "*").

One implementation of determining each enhanced resolution pixel employs a weighted combination of multiple (e.g., 3) image pixel samples that are nearest the enhanced resolution pixel. As shown in FIG. 6, the value PE of an enhanced resolution pixel 110 may be calculated as a weighted sum of the image values $S_A$, $S_B$, and $S_C$ of the three nearest image pixel samples 112A, 112B, and 112C:

$$P_E = W_A S_A + W_B S_B + W_C S_C$$

where the weighting factors $W_A$, $W_B$, and $W_C$ are or correspond to normalized distances $d_A$, $d_B$, and $d_C$ between enhanced resolution pixel 110 and image pixel samples 112A, 112B, and 112C.

It will be appreciated that the image values $S_A$, $S_B$, and $S_C$ of the three nearest image pixel samples 112A, 112B, and 112C for each enhanced resolution pixel can differ according to the target or document being imaged. However, all of the digital camera pixels undergo the same lateral translation. If the lateral oscillations have periodic length equal to an integer number of pixel lengths, it can be seen that if the up-sampling factor is N, pixels separated by N either vertically or horizontally in the high-resolution image will have the same weights.

Thus their values may be computed from the low-resolution data without calculating a unique set of weights for each high resolution pixel location.

The enhanced resolution pixels are formed from combinations of spatially displaced image pixel samples that are obtained at the resolution of the digital camera. The enhanced resolution pixels are selected to have a resolution sufficient to distinguish text characters in the text document. However, combining the spatially displaced image pixel samples introduces a blur or cross-talk into the enhanced resolution pixels.

Moreover, each CCD or CMOS sensor typically has a photosensitive area of about 60% or more of the area of the corresponding pixel. A larger photosensitive area provides the sensor with an improved signal-to-noise ratio, which is desirable in many imaging applications. The consequence of a large photo-sensitive area, however, is that luminance or light is averaged over the larger area as a type of area sampling. Features smaller than the photo-sensitive area are blurred and are of too fine a resolution to be distinguished.

Such area sampling can be modeled as differing from point sampling in that the luminance function is first convolved by the transform of the area. Assuming a rectangular photo-sensitive area, the luminance is thus first convolved by a boxcar or square function.

Equivalently, the luminance spectrum is weighted by a Sin(f)/f function, which attenuates higher frequencies. For example a sensor with a photo-sensitive area having a width p will have a transform that is a Sinc, the first spectral null of which occurs at $2\pi/p$. This can severely limit the possible resolution that can be achieved by the sensor. No matter how many frames are used, every single one of them will have spectrum attenuated by this function. For example if p is 80% of the distance between pixels, and it is desired to up-sample by a factor of 4, the lowest spectral null with null frequencies with period of 3.2 pixels at the target resolution, and all frequencies above will be severely attenuated.

Process block 120 indicates that the enhanced resolution pixels are de-blurred. De-blurring entails characterizing each enhanced resolution pixel as being of one of only two image display levels (e.g., gray levels or luminance), as described below in greater detail. De-blurring effectively conforms the document text characters to the enhanced resolution of the enhanced resolution pixels and the number of luminance levels obtained by the camera sensors, thereby providing sufficient text document image capture resolution for individual characters to be distinguished or identified. For example, text characters may be identified automatically with conventional optical character recognition software, as is known in the art. Document capture method 100 allows a digital camera to provide text document image capture despite having a single-image resolution that that would be insufficient to distinguish text characters.

Figure 7:
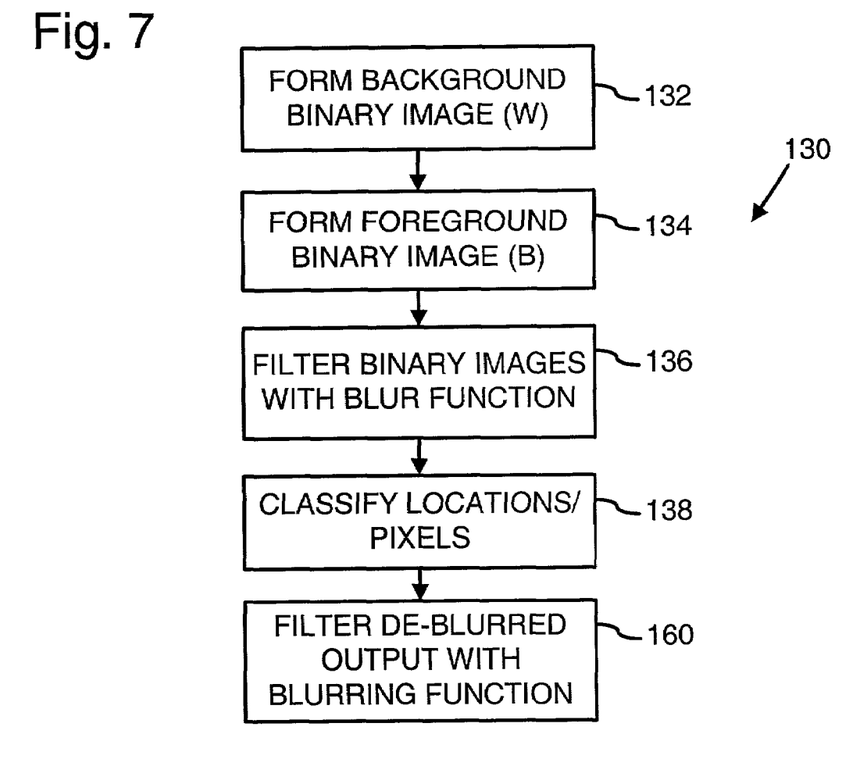
FIG. 7 is a flow diagram of one implementation of an enhanced resolution pixel de-blurring method for de-blurring enhanced resolution pixels that are formed from combinations of multiple spatially-displaced images.

FIG. 7 is a flow diagram of one implementation of an enhanced resolution pixel de-blurring method 130 for de-blurring enhanced resolution pixels that are formed from combinations of multiple spatially-displaced images. For simplicity of description, de-blurring method 130 is described with reference to a text document image having only a limited palette of colors. Specifically, the limited palette of colors corresponds to two distinct gray levels: a background B and a foreground F as in a text document with plain text on a plain background. As a result, each of the pixels in each of the N acquired VGA frames will be of the form:

$$\alpha B+(1-\alpha)F, \text{ for } 0<\alpha \leq 1.$$

De-blurring method 130 allows each enhanced resolution pixel R to be classified as either foreground or background. Typically, some enhanced resolution pixels will be entirely the of foreground or background color (e.g., black or white). Classification of these enhanced resolution pixels can be simple. However, large numbers of enhanced resolution pixels will be of an intermediate color, tone or shade because of the operation of the averaging function between adjacent spatially displaced image pixel samples. De-blurring method 130 allows the enhanced resolution pixels of intermediate color to be classified as either foreground or background.

It will be noted that for common font sizes it may often happen that many background pixels are acquired (e.g., pixels where $\alpha=1$) while very few, if any, foreground pixels are acquired (e.g., pixels where $\alpha=0$).

In an exemplary implementation having a VGA-resolution sensor and a U.S. letter-size (or A4-size) text document, each digital camera pixel covers roughly 1/72 inch (0.054 mm) square which is larger than the stroke width for most 9 point fonts. De-blurring method 130 can provide accurate classification of enhanced resolution pixels despite such constraints.

Process block 132 indicates that a binary image W is formed of locations that are within a threshold $T_{w1}$ of being a background level (e.g., white).

Process block 134 indicates that a binary image B is formed of locations that are within a threshold $T_{b1}$ of being a foreground level (e.g., black).

Process block 136 indicates that the binary images W and B are filtered by a blur function b having the same dimension as the sensor averaging area (e.g., approximately the pixel pitch or width p). The filtering of the binary images W and B may be represented as W*b, and B*b, with b being the VGA blur function at the enhanced or target resolution. The filtering may be characterized by the following propositions:

- A gray pixel that is within p of a white pixel can not be black
- A gray pixel that is within p of a black pixel can not be white.

These propositions are based upon the averaging nature of the digital camera sensors, which blur white to black transitions by 2p.

Process block 138 indicates that all locations or pixels in W*b that are below a threshold $T_{w2}$ are considered white, and all locations or pixels in B*b above a threshold $T_{b2}$ are considered black. In this implementation, de-blurring method 130 involves only relatively simple filtering and thresholding operations.

Figure 8:
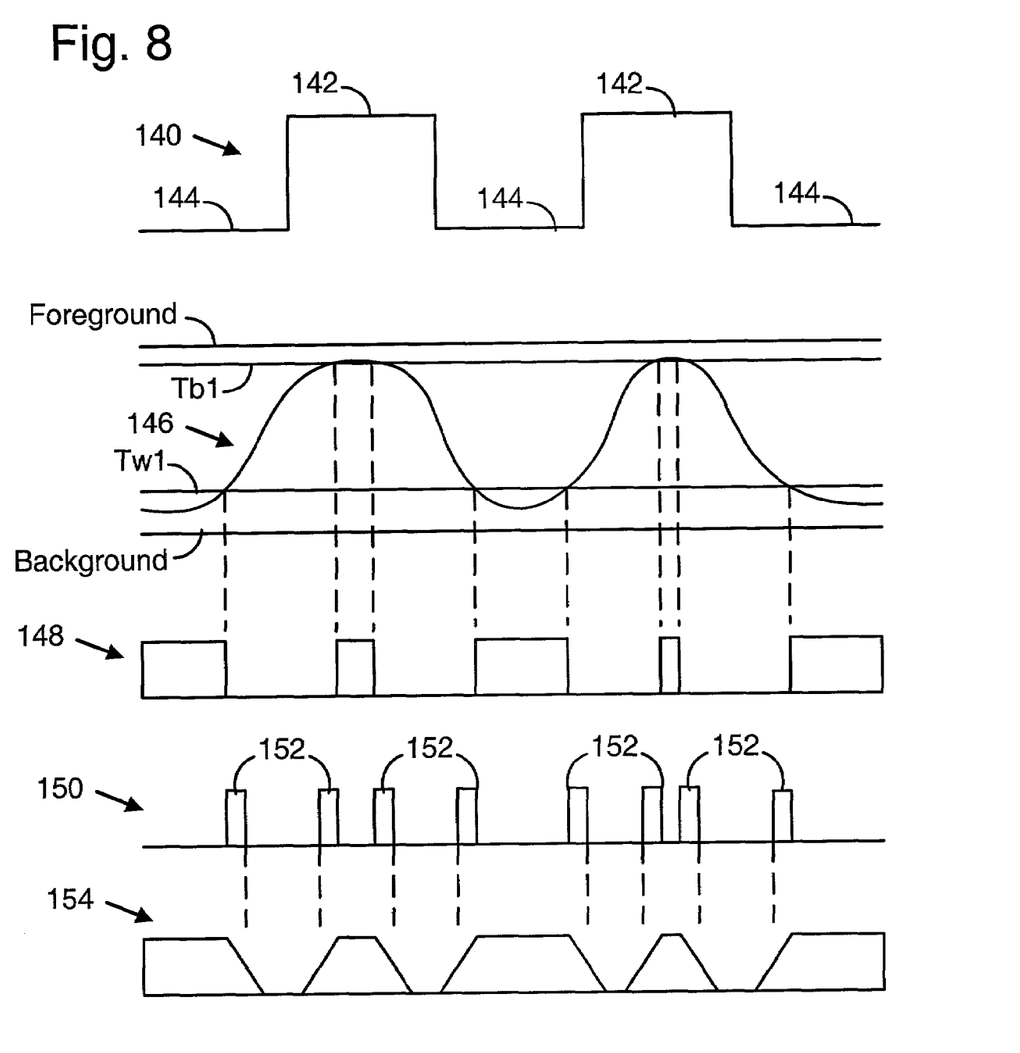
FIG. 8 is a diagram of various image signal characteristics to illustrate operation of a de-blurring method.

FIG. 8 is a diagram of various image signal characteristics to illustrate operation of de-blurring method 130. A luminance trace 140 of an image portion corresponding to an ideal bi-level representation of a text document with a foreground feature 142 (e.g., black) and a background 144.

A luminance trace 146 illustrates the blurring of the ideal bi-level representation of luminance trace 140 imparted by operation of the digital camera and the resolution enhancement. The portion of trace 146 within threshold $T_{w1}$ of process block 132 of the background level is indicated and corresponds to image portions classified as the background level (binary image W). The portion of trace 146 within threshold $T_{b1}$ of process block 134 of the foreground level is indicated and corresponds to image portions classified as the foreground level (binary image B). A partial luminance trace 148 indicates the partial classification provided by operation of process blocks 132 and 134.

A filtering trace 150 indicates operation of the filtering of process block 136 in which a blur filter 152 of width p is applied to the preliminary foreground and background regions determined by operation of process blocks 132 and 134. A partial luminance trace 154 indicates the result of the filtering operation of process block 136.

While de-blurring method 130 is simple, and works well in classifying background pixels, classification of some foreground pixels can sometimes be erroneous. The reason is that, as previously mentioned, the number of pixels that are completely foreground (i.e. $\alpha=0$), rather than some blend of foreground and background, is often very small. Thus the image B may be very small or even entirely empty, i.e. there may be very few pixels that are entirely black, or none at all. This has the effect that the outlines of characters such as "e" will be sharply defined, but the background "hole" in the top loop might not be defined.

In an alternative implementation, de-blurring method 130 could further include the following steps to overcome this problem. Optional process block 160 indicates that the W*b output of de-blurring method 130 is blurred by the VGA blur function and subtracted from the original:

$$E=R-(T_{w2}(W*b))*b.$$

The energy of this difference signal will be concentrated in the areas that have been mis-classified. Numerous variations using a simple threshold, an adaptive threshold, or a voting protocol are possible for this last stage, and we have found many give comparable results.

In one implementation, the percent difference between $R-T_{w2}(W*b)$ and R is examined to determine which of the interior pixels that were classified as foreground (e.g., black) in the first stage of the method ought to be classified as background (e.g., white). For example, the following threshold may be applied to the image $$Rect(R-T_{w2}(W*b))/\max(1, R),$$

where Rect( ) is a halfwave rectifier, and max(.) is a per pixel maximum operator. It has been found that thresholding this quantity by $T_p=0.4*(F-B)$ is suitable, where F-B refers to the difference between the foreground display level F and the background display level B.

Differing thresholds may be selected according to the circumstances. In the case where there is little noise in the background it has been found that the following choices are suitable: $T_{w1}=0.04*(F-B)$, $T_{w2}=0.9*(F-B)$, $T_{b1}=0.96*(F-B)$, $T_{b2}=0.1*(F-B)$ With noise in the background, represented by a spread of pixel values for W rather than a well-defined peak, different threshold values can be used. For example, if the spread of values of pixels of background color W is S, it has been found that the following choices work well: $T_{w1}=0.04*(F-B)+0.2*S$, $T_{w2}=0.9*(F-B)-0.2*S$, $T_{b1}=0.96*(F-B)$, $T_{b2}=0.1*(F-B)$.

Determining or estimating the foreground color F can be difficult.

While there are typically many background pixels, there will often be very few if any pixels from any of the VGA images that are completely foreground. It has been found that the methods above are fairly robust to errors in estimating F. Moreover, errors in estimating F affect the second part of the algorithm, but not the first, and the majority of classifications occur in the first part.

Figure 9:
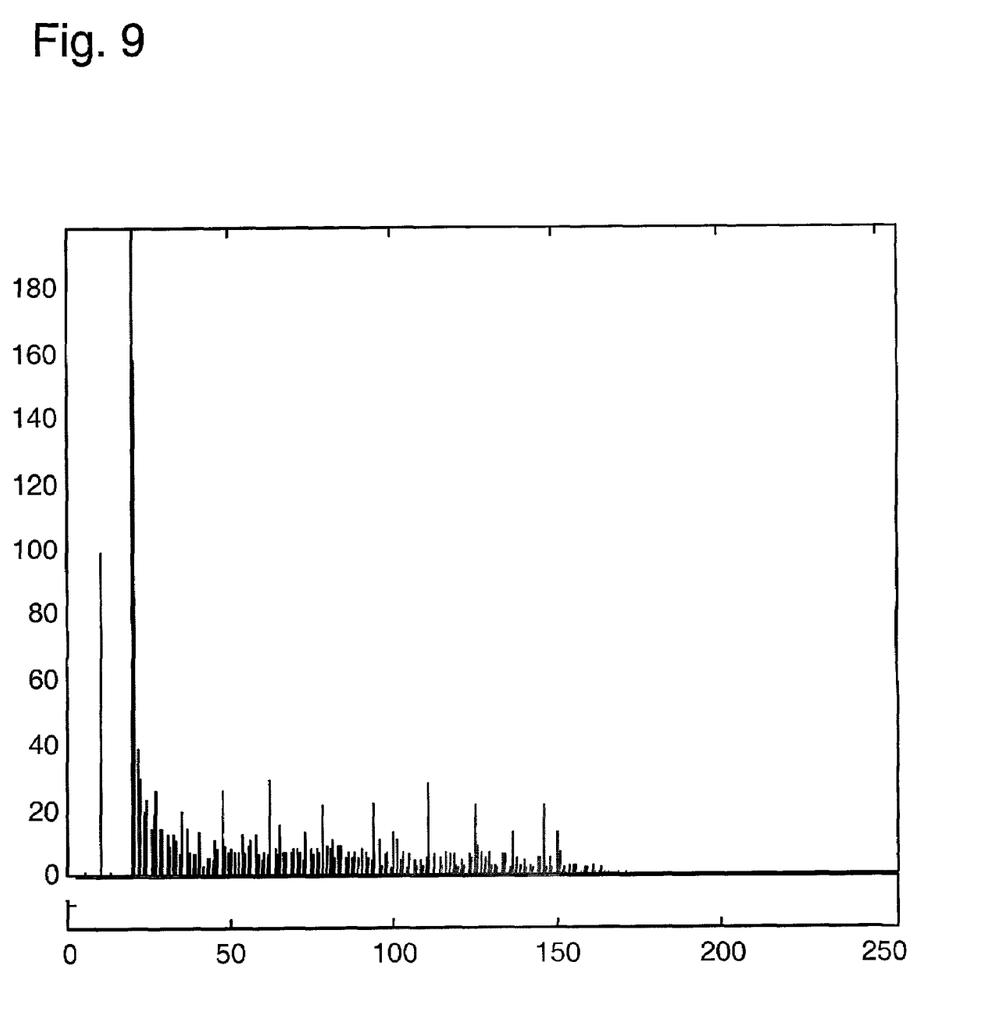
FIG. 9 shows a histogram of pixel values in a VGA image.

FIG. 9 shows a histogram of pixel values in a VGA image with background gray level 20 and foreground 220. The histogram shows a distribution of a that will allow foreground F to be estimated. First, an estimate is made for the background B, which estimate typically is not difficult given the large number of pixels that are purely background. A probability distribution function (pdf) is then fitted to the histogram of the pixel data. Good results have been achieved by fitting an exponential distribution. If the total number of points in the histogram is M, the average of that largest M/100 pixels is computed (largest means the pixels with values furthest from the background color B) and choose F to be two standard deviations from that point. A number of other approaches are of course possible.

The implementation described above is directed to a monochrome digital camera sensor and monochrome documents. A complicating factor is that most digital cameras use color sensors arranged in a color mosaic, such as the Bayer mosaic. Thus only one color per pixel is obtained and interpolation is used to populate the array to a full color image. For color documents $F=(R_f, G_f, B_f)$ and $B=(R_b, G_b, B_b)$ will be vector rather than scalar quantities. There are still only two levels to deal with, and a similar approach is applied to estimating these values from the histogram of the acquired data. Each of the N acquired images $I_i$ will now have only a single color at each location rather than three. However the other two colors can be estimated once B and F have been estimated. For example, if a red value of $R_x$ is measured at a certain location by estimating $$\alpha_x = (R_f - R_x)/(R_b - R_f),$$

and from this $G_x$ and $B_x$ can be derived. Thus, while slightly more complicated, the case of a color sensor also can be treated in the framework of the above methods. Once the interpolation has been done, the method can be applied in a color plane independent fashion, or the thresholding and filtering operations described in the main method above can be applied on only one of the color planes while applying the classification decisions on all three.

The present system and method utilize multi-frame reconstruction that can be significantly simplified because text documents primarily include regions that are spatially piecewise constant (e.g., monochrome text on a monochrome background). In contrast, conventional multi-frame image reconstruction addresses the issue of reconstruction of arbitrary image objects, which requires solution of ill-constrained Fourier reconstruction problems. Directing consideration to images that are spatially piecewise constant means that only transitions between a limited palette of discrete values need be ascertained. This simplification holds well for plain text on plain backgrounds and greatly eases the task of reconstruction from multiple frames.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention.

The invention claimed is:

1. A text document capture method for digitizing a text document segment in printed form, consisting of:
   imparting a continuous lateral jittering between a digital imaging device and the text document;
   obtaining multiple laterally-displaced digital images of all of the text document segment during the continuous lateral jittering and determining fractional pixel offset positions at which each image was obtained directly from the lateral displacement of each digital image;
   forming from the multiple laterally displaced images enhanced resolution image pixels of an enhanced resolution representation of the text document as a direct function of the fractional pixel offset positions;
   said direct function providing a weighted combination of the image values of a plurality of multiple image pixel samples, derived from the multiple laterally-displaced digital images, which are determined to be nearest each enhanced resolution image pixel using the fractional pixel offset positions; and
   de-blurring the enhanced resolution representation of the text document by thresholding the enhanced resolution representation into either one of two pixel luminance levels, representing foreground and background pixels, with the foreground pixels corresponding to text in the text document.

2. The method of claim 1 in which the lateral jittering between the digital imaging device and the text document is imparted in a pair of transverse directions.

3. The method of claim 2 in which the transverse directions are generally perpendicular to each other.

4. The method of claim 2 in which the lateral jittering is imparted simultaneously in the pair of transverse directions.

5. The method of claim 1 in which the lateral jittering is cyclic.

6. The method of claim 1 in which the digital imaging device includes an array of optical detectors corresponding to pixels and having pixel dimensions and the jittering moves the digital imaging device by about the pixel dimensions.

7. The method of claim 1 in which the text document segment is substantially all of the text document.

8. The method of claim 1 in which the forming the enhanced resolution representation of the text document includes calculating weighted sums from the multiple laterally displaced images.

9. The method of claim 1 in which de-blurring the enhanced resolution representation of the text document further includes applying a blur filter to the enhanced resolution representation.

10. The method of claim 9 in which the digital imaging device includes an array of optical detectors corresponding to pixels and having pixel dimensions and in which the blur filter has a filter dimension corresponding to one of the pixel dimensions.

11. A text document capture system for digitizing with a digital imaging device a segment of a text document in printed form, consisting of:
   a jittering mechanism for imparting a continuous lateral jittering between the text document and the digital imaging device while it obtains multiple laterally-displaced digital images of all of the text document segment, said lateral jittering moving through a distance being on the order of around one pixel;

a pixel offset determination system for determining fractional pixel offset positions at which each digital image was obtained directly from the lateral displacement of each digital image;

a processing system for forming enhanced resolution image pixels of an enhanced resolution representation of the text document segment from the multiple laterally displaced images as a direct function of the pixel offset positions corresponding to each digital image, and for de-blurring the enhanced resolution; and wherein the enhanced resolution image pixels are computed from a weighted combination of the image values of a plurality of multiple image pixel samples, derived from the multiple laterally-displaced digital images, which are determined to be nearest each enhanced resolution image pixel using the fractional pixel offset positions.

12. The system of claim 11 in which the jittering mechanism includes oscillators with transverse orientations for imparting cyclic lateral jittering in transverse directions between the text document and the digital imaging device.

13. The system of claim 12 in which the oscillators include piezo-electric oscillators.

14. The system of claim 11 in which the jittering mechanism imparts lateral jittering on the digital imaging device.

15. The system of claim 11 in which in which the digital imaging device includes an array of optical detectors corresponding pixels and having pixel dimensions and the jittering mechanism moves the digital imaging device by about the pixel dimensions.

16. The system of claim 11 in which the text document segment is substantially all of the text document.

17. The system of claim 11 in which the processing system includes a computer that executes software instructions to form the enhanced resolution representation of the text document segment and to de-blur the enhanced resolution representation.

18. The system of claim 11 in which de-blurring the enhanced resolution representation of the text document includes conforming the enhanced resolution representation to only two image levels as a function of first and second thresholds.

19. The system of claim 18 in which de-blurring the enhanced resolution representation of the text document includes applying a blur filter to the enhanced resolution representation.

20. The system of claim 19 in which the digital imaging device includes an array of optical detectors corresponding to pixels and having pixel dimensions and in which the blur filter has a filter dimension corresponding to one of the pixel dimensions.

21. In a computer-readable medium, text document capture software for digitizing with a digital imaging device a text document segment in printed form, consisting of:

software for imparting controlled continuous lateral jittering between the text document and the digital imaging device;

software for obtaining multiple laterally-displaced digital images of all of the text document segment at a plurality of non-predetermined fractional pixel offsets relative to an original position of the text document relative to the digital imaging device;

software for determining the fractional pixel offsets of each digital image;

software for forming enhanced resolution image pixels of an enhanced resolution representation of the text document segment from the multiple laterally displaced images as a direct function of the fractional pixel offsets;

said direct function providing a weighted combination of a plurality of multiple image pixel samples, derived from the multiple laterally-displaced digital images, which are determined to be nearest each enhanced resolution image pixel using the fractional pixel offsets; and software for de-blurring the enhanced resolution representation.

22. The medium of claim 21 in which the lateral jittering between the digital imaging device and the text document is imparted in a pair of transverse directions.

23. The medium of claim 21 in which the digital imaging device includes an array of optical detectors corresponding to pixels and having pixel dimensions and the jittering moves the digital imaging device by about the pixel dimensions.

24. The medium of claim 21 in which the software for forming the enhanced resolution representation of the text document includes software for calculating weighted sums from the multiple laterally displaced images.

25. The medium of claim 21 in which the software for de-blurring the enhanced resolution representation of the text document includes software for conforming the enhanced resolution representation to only two image levels.

26. The medium of claim 25 in which the software for de-blurring the enhanced resolution representation of the text document includes software for applying a blur filter to the enhanced resolution representation.

27. The medium of claim 26 in which the digital imaging device includes an array of optical detectors corresponding to pixels and having pixel dimensions and in which the blur filter has a filter dimension corresponding to one of the pixel dimensions.

28. An image capture method for digitizing a spatially piecewise constant image, consisting of:

imparting a continuous lateral jittering between a digital imaging device and the spatially piecewise constant image;

obtaining multiple laterally-displaced digital images of all of the spatially piecewise constant image during the continuous later jittering;

computing a fractional pixel offset distance representing a pixel capture position for each digital image directly from the lateral displacement of each digital image;

forming from the multiple laterally displaced images enhanced resolution image pixels of an enhanced resolution representation of the spatially piecewise constant image as a direct function of the computed fractional pixel offset distances;

said direct function providing a weighted combination of a plurality of multiple image pixel samples, derived from the multiple laterally-displaced digital images, which are determined to be nearest each enhanced resolution image pixel using the fractional pixel offset distances; and de-blurring the enhanced resolution representation of the spatially piecewise constant image.

* * * * *